No. 882,391. PATENTED MAR. 17, 1908.
J. B. JONES.
WAGON BRAKE.
APPLICATION FILED JUNE 8, 1906.

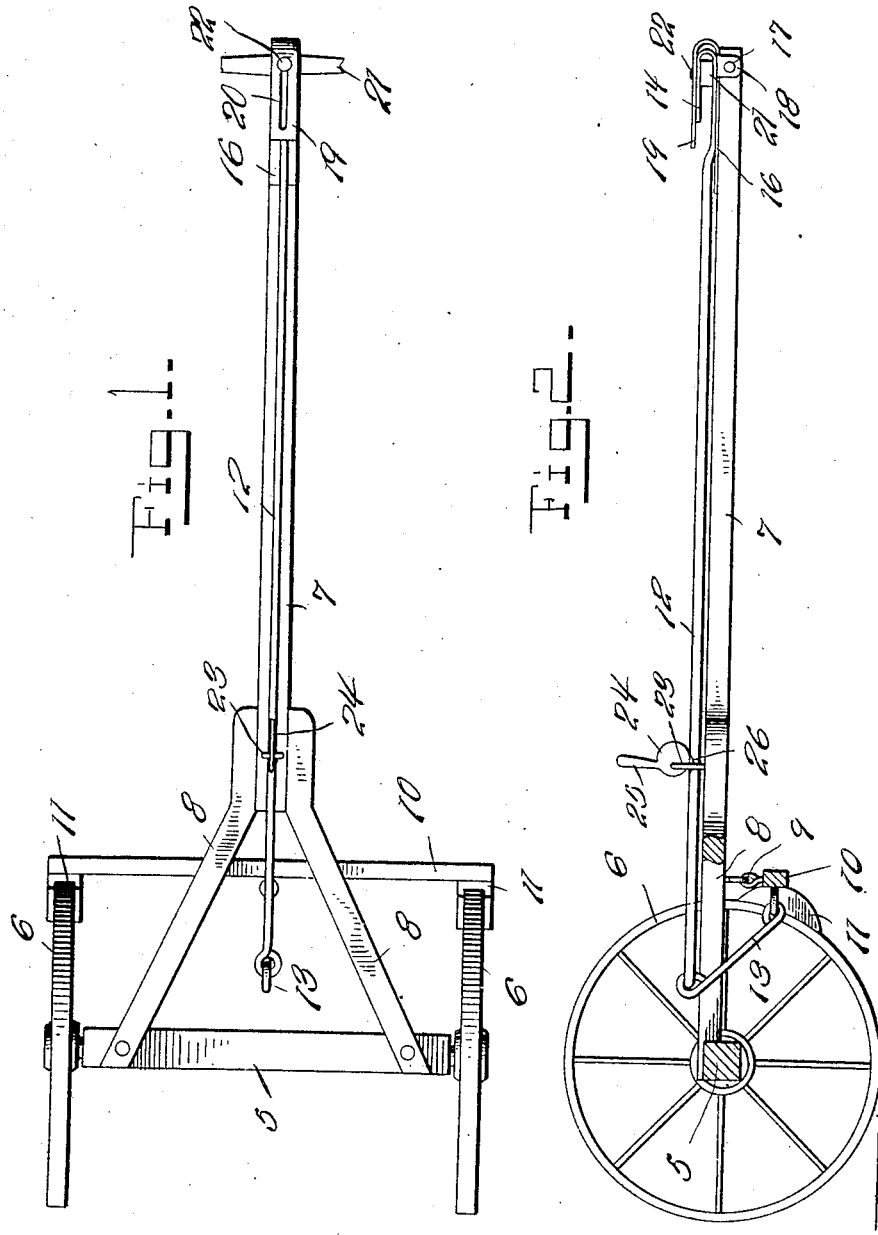

2 SHEETS—SHEET 2.

Witnesses
G. R. Thomas
F. B. MacNab

Inventor
J. B. Jones
By
Attorneys

UNITED STATES PATENT OFFICE.

JAMES B. JONES, OF MAXIE, MISSISSIPPI.

WAGON-BRAKE.

No. 882,391.        Specification of Letters Patent.        Patented March 17, 1908.

Application filed June 8, 1906. Serial No. 320,839.

*To all whom it may concern:*

Be it known that I, JAMES B. JONES, a citizen of the United States, residing at Maxie, in the county of Perry, State of Mississippi, have invented certain new and useful Improvements in Wagon-Brakes; and I do hereby declare the following to be a full, clear, and exact description of the invention, such as will enable others skilled in the art to which it appertains to make and use the same.

This invention relates to vehicle-brakes and more particularly to that class of vehicle brakes which are automatically applied when descending a hill, the brake being put in operative position by the holding back of the horses while traveling down hill.

A further object of the invention is to provide means for rendering the brake inoperative when desired, the said means being located directly in front of the dash-board or seat of the vehicle.

Figure 3:
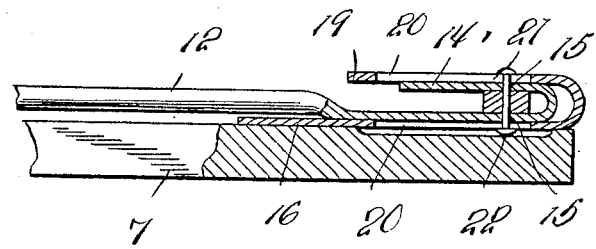
Figure 4:
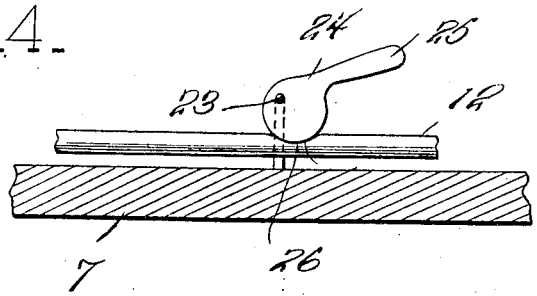
Figure 5:
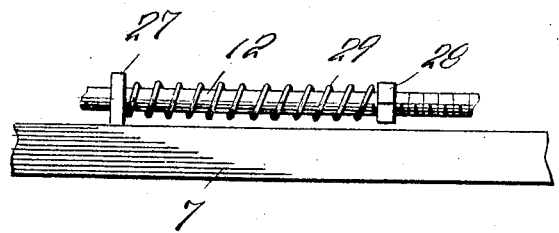

With the above and other objects in view, the present invention consists in the construction and arrangement of parts, shown in the accompanying drawings, in which:

Figure 1 is a plan view of the tongue and front axle of a vehicle, showing the invention applied. Fig. 2 is a side elevation of the invention, parts being broken away. Fig. 3 is a detail sectional view through the front end of the pole or turn-vehicle and showing the means for connecting the yoke of the harness with the device, and, Fig. 4 is a similar view showing the means for holding the device in an inoperative position, and, Fig. 5 is a view showing a slightly modified form of the invention.

Referring to the drawings, the numeral 5 denotes the front axle of a vehicle and 6 the wheels supporting the same. A pole or tongue 7 is connected with the axle 5 by means of the usual hounds 8 and pivotally supported from the hounds 8 as at 9 is a brake-beam 10 provided at each end with a brake-shoe 11 in position to contact with the wheels 6.

Slidably disposed upon the pole 7 is a rod 12 which is connected at its rear end by means of a link 13 with the brake-beam 10, the said rod 12 having its rear end extending rearwardly of the rear end of the pole and the link 13 being inclined in a rearward direction, so that backward movement of the rod 12 will cause the brake-beam to swing with its shoes in contact with the wheels of the vehicle.

The forward end of the rod 12 is flattened and is bent back upon itself as shown at 14, the spaced portions thus formed being provided with alining openings 15. A plate 16 is provided intermediate its ends and at each side with down-turned tongues 17 which lie upon opposite sides of the pole 7 and through which and the said pole are engaged bolts 18. The forward end of the plate 16 is bent back upon itself as at 19 to receive the back turned forward end 14 of the rod 12 and the spaced portions formed by bending the said forward end of the plate back upon itself are provided with alining slots 20 which also are in alinement with the openings 15. A harness yoke 21 of the usual construction is provided intermediate its ends with an opening through which and the openings 15 and slots 20 is engaged a bolt 22 which is headed at each of its ends, thus permitting forward and rearward sliding movement of the rod 12, it being understood that when going down hill the usual pull exerted upon the harness yoke will cause the rod 12 to move rearwardly and hence apply the brake to the wheels 6.

I provide upon the tongue means for holding the rod 12 against operation when so desired, in such instances as traveling down a slight grade or over uneven roads, the said means comprising a guide yoke 23 through which the rod 12 passes, and a cam 24 which is pivoted to the connecting portion of the yoke in position to engage the rod 12, the said cam being adapted for movement by means of a finger-piece 25 and being adapted to seat when in engagement with the rod 12 in a recess 26 formed therein.

In the form of my invention shown in Fig. 5, I provide upon the tongue 7 an eye member 27 through which the rod 12 extends, and upon the said rod and in advance of the eye member 27 there is secured a collar 28 between which and the eye member 27 is disposed a spring 29 which spring serves to hold the rod 12 normally at the forward limit of its movement, this construction being particularly useful in connection with a two-horse team and heavy wagons.

What is claimed is:

In a device of the class described, the combination with a vehicle tongue and its hounds, of a brake beam supported by the hounds, a brake rod supported upon the tongue and connected with the beam, said rod being bent back upon itself at its forward end, a plate secured upon the forward end of the tongue and bent to form an overlying portion, the attaching and overlying portion of the plate being provided with openings, a yoke received in the bent back portion of the brake rod, and a bolt engaged through the yoke and the said portion of the rod and through the slots on the plate.

In testimony whereof, I affix my signature, in presence of two witnesses.

JAMES B. JONES.

Witnesses:
W. L. TROTTER,
B. P. MAY.